(12) United States Patent
Olsson

(10) Patent No.: US 10,541,631 B2
(45) Date of Patent: Jan. 21, 2020

(54) ELECTRIC MOTOR ARRANGEMENT ADAPTED FOR USE IN AN ACTUATOR AND AN ACTUATOR INCLUDING THE MOTOR ARRANGEMENT

(71) Applicant: REAC AB, Amal (SE)

(72) Inventor: Johan Olsson, Amal (SE)

(73) Assignee: REAC AB, Amal (SE)

( * ) Notice: Subject to any disclaimer, the term of this patent is extended or adjusted under 35 U.S.C. 154(b) by 123 days.

(21) Appl. No.: 15/580,939

(22) PCT Filed: Apr. 22, 2016

(86) PCT No.: PCT/EP2016/058971
§ 371 (c)(1),
(2) Date: Dec. 8, 2017

(87) PCT Pub. No.: WO2016/198196
PCT Pub. Date: Dec. 15, 2016

(65) Prior Publication Data
US 2018/0167001 A1    Jun. 14, 2018

(30) Foreign Application Priority Data

Jun. 8, 2015    (SE) ...................................... 1550746

(51) Int. Cl.
*H02K 7/10*        (2006.01)
*H02P 3/04*        (2006.01)
(Continued)

(52) U.S. Cl.
CPC .............. *H02P 3/04* (2013.01); *F16D 63/008* (2013.01); *H02K 7/1166* (2013.01); *H02K 49/10* (2013.01);
(Continued)

(58) Field of Classification Search
CPC ...... F16D 63/008; H02K 27/00; H02K 49/10; H02K 7/1166; H02P 3/04; H02P 3/12; H02P 3/16
See application file for complete search history.

(56) References Cited

U.S. PATENT DOCUMENTS 3,715,643 A * 2/1973 Masaki .................. D05B 69/12
318/382
5,751,127 A * 5/1998 Austin ................... H02K 7/106
188/171
(Continued)

FOREIGN PATENT DOCUMENTS

DE    2115681 A1    11/1971
DE    2735763 A1    2/1979
(Continued)

OTHER PUBLICATIONS

International Search Report for PCT Application No. PCT/EP2016/058971, dated Jul. 14, 2016, 3.

*Primary Examiner* — Yuriy Semenenko
(74) *Attorney, Agent, or Firm* — Johnson, Marcou & Isaacs, LLC; John M. Harrington, Esq.

(57) ABSTRACT

This invention relates to a linear type actuator unit, said actuator unit (100), including an electric motor (1) driving a linear actuator (2) of, said motor (1) having a casing (11), a stator (14,15) fixed to the casing, a rotor (13) fixed to a rotary part (10), preferably a rotary motor shaft (10), wherein said rotary part (10) is arranged to be operatively connected to a reduction gear (5) which drives the mechanical output of the actuator (2), a separate magnetic brake unit (3), said magnetic brake (3) including a rotating brake member (30,31) connected to the motor shaft (10), directly or indirectly, and a plurality of fixed brake members (32, 33), wherein said magnetic brake (3) is arranged to produce a torque that will strive to position a rotary member (10, 20) with said rotating (Continued)

brake member (30,31) into one or more specific angular positions in relation to the fixed brake members (32, 33), and wherein said rotating brake member (30,31) is in the form of a separate annulus (30, 31) attached to said rotary member (10, 20) arranged to brake the motor at low rotational speeds and in that the actuator unit (100) is arranged with a circuitry (101) including a short circuiting arrangement (113, 103) arranged to enable braking of the motor (1) at rotational speeds above low rotational speeds.

16 Claims, 7 Drawing Sheets

(51) Int. Cl.
| | | |
|---|---|---|
| *H02K 49/10* | (2006.01) | |
| *H02P 3/12* | (2006.01) | |
| *H02P 3/16* | (2006.01) | |
| *H02K 7/116* | (2006.01) | |
| *F16D 63/00* | (2006.01) | |
| *H02K 27/00* | (2006.01) | |

(52) U.S. Cl.
CPC ............... *H02P 3/12* (2013.01); *H02P 3/16* (2013.01); *H02K 27/00* (2013.01)

(56) References Cited

U.S. PATENT DOCUMENTS

| | | | | |
|---|---|---|---|---|
| 6,111,378 | A | * | 8/2000 | LeMay ............... B60R 16/0315 15/250.17 |
| 2016/0233798 | A1 | * | 8/2016 | Barbier ...................... B60J 1/17 |
| 2017/0207679 | A1 | * | 7/2017 | Shoda ....................... B60S 1/08 |
| 2017/0373568 | A1 | * | 12/2017 | Ota ........................ H02K 7/1166 |

FOREIGN PATENT DOCUMENTS

| | | |
|---|---|---|
| DE | 102008001041 A1 | 10/2009 |
| WO | 2006048023 A1 | 5/2006 |
| WO | 2013156028 A1 | 10/2013 |

* cited by examiner

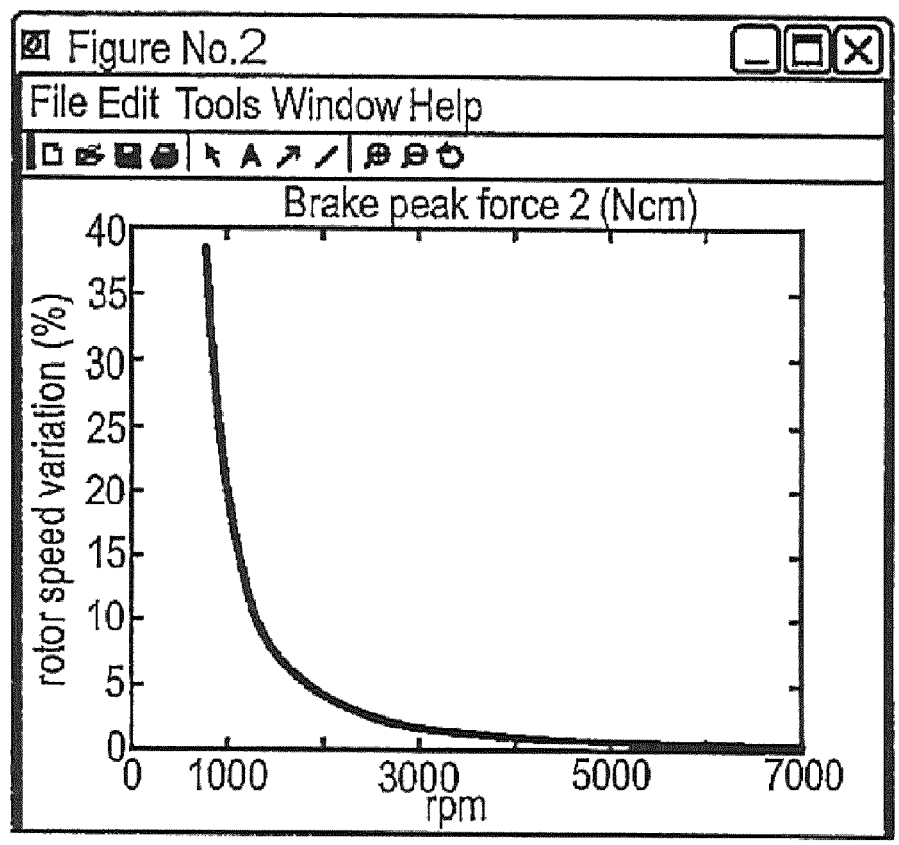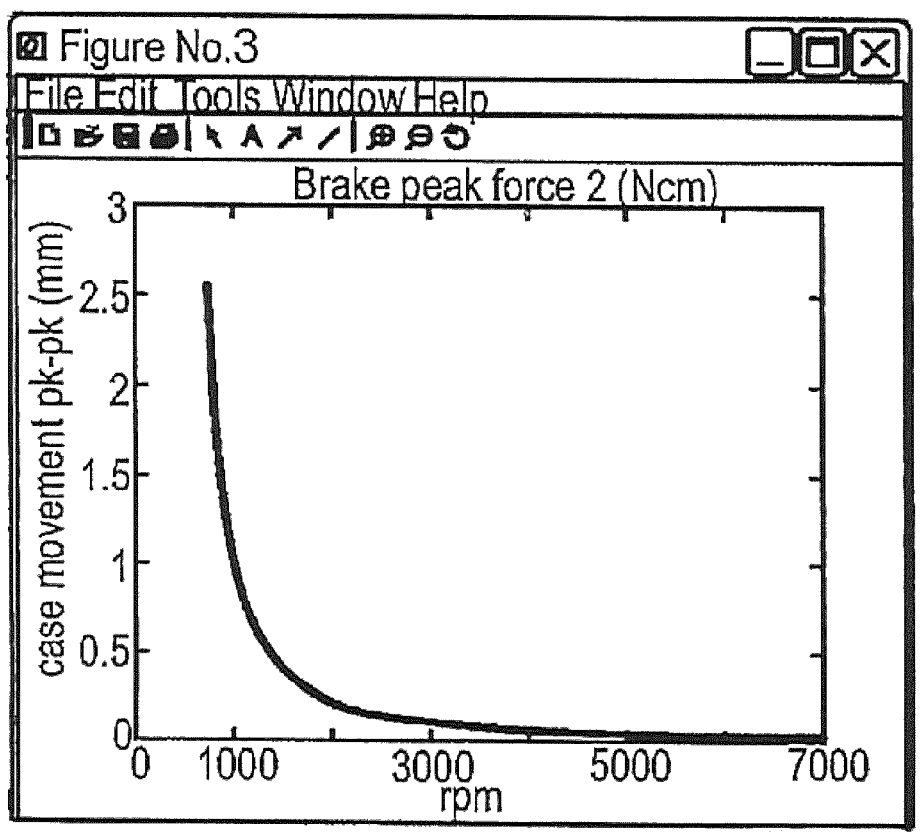

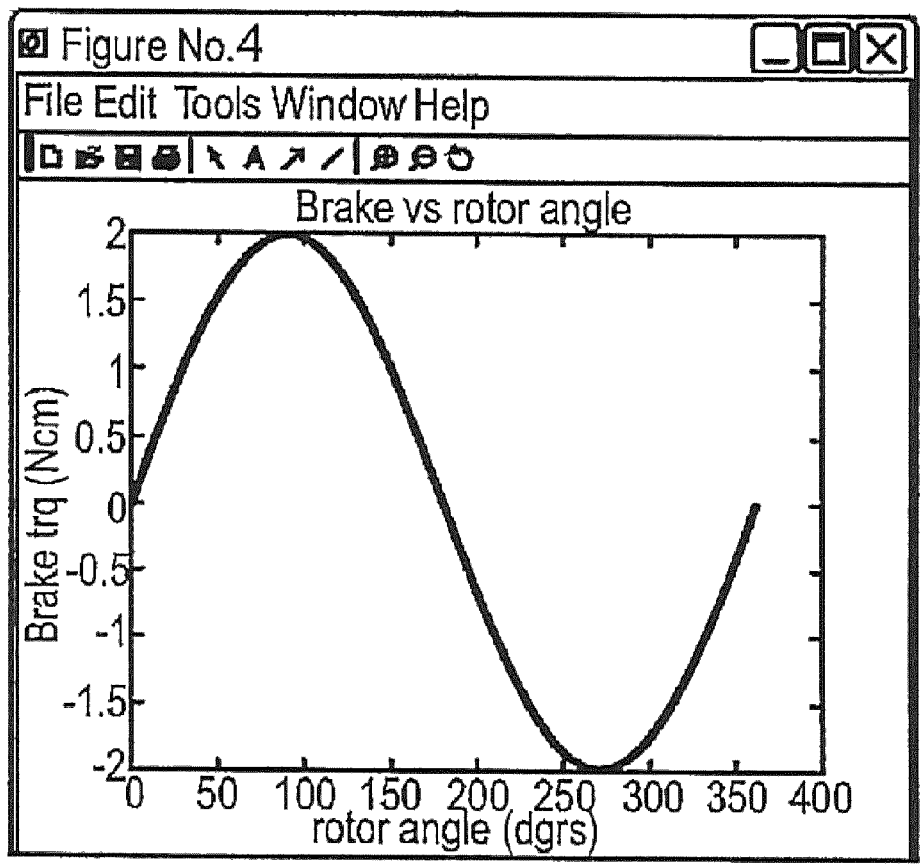
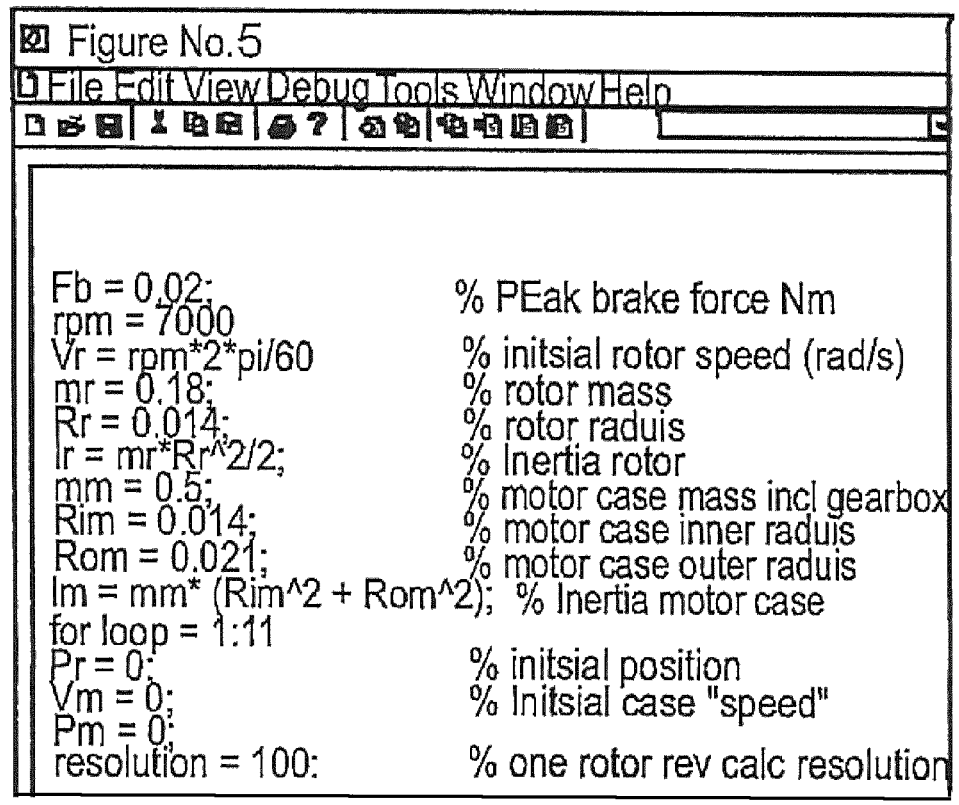

ELECTRIC MOTOR ARRANGEMENT ADAPTED FOR USE IN AN ACTUATOR AND AN ACTUATOR INCLUDING THE MOTOR ARRANGEMENT

CROSS REFERENCE TO RELATED APPLICATIONS

This application is a 35 U.S.C. § 371 national stage of International Application No. PCT/EP2016/058971 filed on Apr. 22, 2016, published in English under PCT Article 21(2), which claims the benefit of priority to Swedish Patent Application No. 1550746-0 filed on Jun. 8, 2015, the disclosures of which are hereby incorporated by reference.

TECHNICAL FIELD

The present invention relates to an electric motor arrangement adapted for use in an actuator arrangement, preferably linear actuator arrangement that includes a rotary screw driven by the motor and a cooperating nut secured against rotation for travelling on the screw upon rotation thereof, said motor having a rotary shaft operatively connected to the screw.

BACKGROUND ART

The invention relates to linear actuators. A majority of linear actuators include motor/gearbox/spindle+nut arrangements. Normally when an external force is applied on an inactive (stopped) actuator—the mechanic self-lock created by gearbox and spindle will make actuator hold its position.

However, when external load is dynamic and also shifts direction (push to pull to push), the self-lock is not 100% reliable, especially if these dynamic forces are present for longer periods of time.

In order to solve this, many companies offer brakes as bolt-on options on actuators, but this solution has drawbacks. For example cost, increased size and increased power consumption. Also it is normal that the brake is based on an electromagnet which also requires special interfaces to the control system.

From WO2006048023 there is known magnetic brake device that may be used to safely position a table top, e.g. to eliminate a table top from being lowered by its own weight. The magnetic brake device comprises a rotor part that is produced in one piece and that has cruciform cross-section made of a magnetizable material, e.g. iron. Such a solution is deficient in applications where frequent vibrations and/or abrupt movements frequently occur in the vertical. Seats used in vehicles is a typical application of that kind, e.g. tractors, wheelchairs, etc. where relatively large gravitational forces applied to the seat and wherein the ground upon which the vehicle travels will cause frequently occurring vertical movements and thereby also forces. Such forces may be of a relatively large magnitude implying that the magnetic brake must be able to withstand relatively large torque. At the same time it is desired to keep the mass of the magnetic brake within acceptable limits as well as the size thereof in order to not compromise regarding output or compactness.

Further, from U.S. Pat. No. 5,751,127A a magnetic brake is disclosed of a multi-pole magnet assembly kind, suggested for a specific kind of applications having a pivotal device to lock, e.g. a retractable landing light assembly of an aircraft, to eliminate the risk that the lowered landing lights may be forced back into the plane from the high torque caused by the wind outside the plane.

SUMMARY OF THE INVENTION

According to one aspect of the present invention, one object of the invention is to provide an electric motor arrangement that is provided with a contact less positioning device, providing a force that strives to position the rotor in a determined angular position, that when used in a linear actuator will improve the self-lock of the actuator without requiring a mechanical brake, e.g. a bolt-on brake that is cost effective and reliable that will function both at low and high speeds.

In a linear actuator arrangement of the kind referred to above, this object is achieved with a motor arrangement according to claim 1.

Thanks to the invention there is provided a magnetic brake that may be produced cost efficiently and that may provide a sufficiently large torque at low speeds at the same time as it may provide compactness, in combination with a supplementary braking arrangement at high speeds by means of a motor short circuit arrangement. Furthermore, there is an advantage with the design according to the invention in that a balanced rotating system may easily be achieved. Further thanks to the invention demands for higher speed and load capacities may be met, at the same time as power consumption may be kept at a low level.

Thanks to the invention braking will occur also when connection between controller and motor is lost during high speed operation in the same direction as the load. Hence, there is provided a solution by having a motor control circuit that operates in such a way that when supply or communication is lost, the motor will be short-circuited. This will very effectively stop any ongoing movement of the motor, and subsequently the magnetic brake will begin to work as intended.

Hence, a synergetic solution may be achieved providing increased efficiency of the actuator, based on the fact that the predominant principle configuration of linear actuators is a screw/nut combination that creates the linear movement, driven by a DC-motor with a worm gear, wherein the two parts that have largest impact on efficiency is the worm gear and the screw and acknowledging that most actions taken to increase efficiency—will lead to a loss of self-lock capacity.

When the motor is included in a linear actuator, the magnetic brake will add a relatively small brake torque to the self-lock of the linear actuator, and in most cases this small addition is sufficient to make the self-lock 100% reliable. At normal motor speed, the brake torque will not be noticeable until the speed is reduced to well below normal motor speed, e.g. about 1000 rpm and lower.

According to further aspects;
the short circuiting arrangement includes a relay.
the short circuiting arrangement includes at least one transistor.
The commutator of the electric motor arrangement may be located between the movable magnetic brake member and the rotor, which provides for cost effective design,
the movable magnetic brake member may be located between the commutator and a bearing for the motor shaft, which further for cost effective design,
the casing may comprise an end plate for attachment of the brake pole pieces.
the movable magnetic brake members may comprise one or more permanent magnets of sub ring shape, preferably two half ring shaped members, which makes it easy to fit onto the motor shaft the brake pole pieces may be permanent magnets.

the max power P of the motor in relation to the brake torque T in N/cm applied to the motor shaft by the magnetic brake may be in the region of P/50>T>P/100, wherein preferably 100 W<P<200 W, indicating a most preferred range of brake torque T between 1-4 N/cm.

The motor preferably is a brushed DC motor having a commutator and a permanent magnet stator.

In a preferred embodiment, the motor is a 150 W motor, and the brake torque applied to the motor shaft by the magnetic brake is in the region of 1-2 Ncm. The addition of such a relatively small brake torque to the self-lock of a linear actuator in most cases is sufficient to make the self-lock 100% reliable.

According to another aspect of the present invention, one object of the invention is to provide a linear actuator that will improve the self-lock of the linear actuator without requiring a bolt-on brake.

Moreover, a preferred embodiment of the invention may include a sensor device providing control of the position of the rotating shaft of the actuator, i.e. a sensor device that is positioned at a remote location in relation to the motor.

When the motor is included in a linear actuator, the magnetic brake will add a relatively small brake torque to the self-lock of the linear actuator, and in most cases this small addition is sufficient to make the self-lock 100% reliable.

To reduce the revolutions of the screw of the actuator in relation to the number of revolutions of the motor shaft, the electric motor arrangement preferably is operatively connected to a reduction gear, preferably a worm gear.

Suitably, the screw has a trapezoidal thread with a pitch of 2-16 mm, and the worm gear has a reduction ratio in the interval between 10:1 and 60:1, more preferred between 30:1 and 50:1

BRIEF DESCRIPTION OF THE DRAWINGS

In the following, the invention will be described in more detail with reference to preferred embodiments and the appended drawings.

FIG. 2 is a diagram showing a curve presenting how the variations of rotor speed relate to the average rotor speed, with a motor in accordance with the invention FIG. 3 is a diagram a showing a curve presenting how the casing movements relates to the average rotor speed, with a motor in accordance with the invention, FIG. 4 is a diagram showing a curve presenting how the brake torque varies in relation to rotor angle, with a motor in accordance with the invention, FIG. 5 presents data used as basis for simulations used to produce the curves of FIGS. 2-4, FIG. 7b is a schematic view of a control arrangement in accordance with the invention that is modified in relation to FIG. 7a.

DETAILED DESCRIPTION

Figure 1:
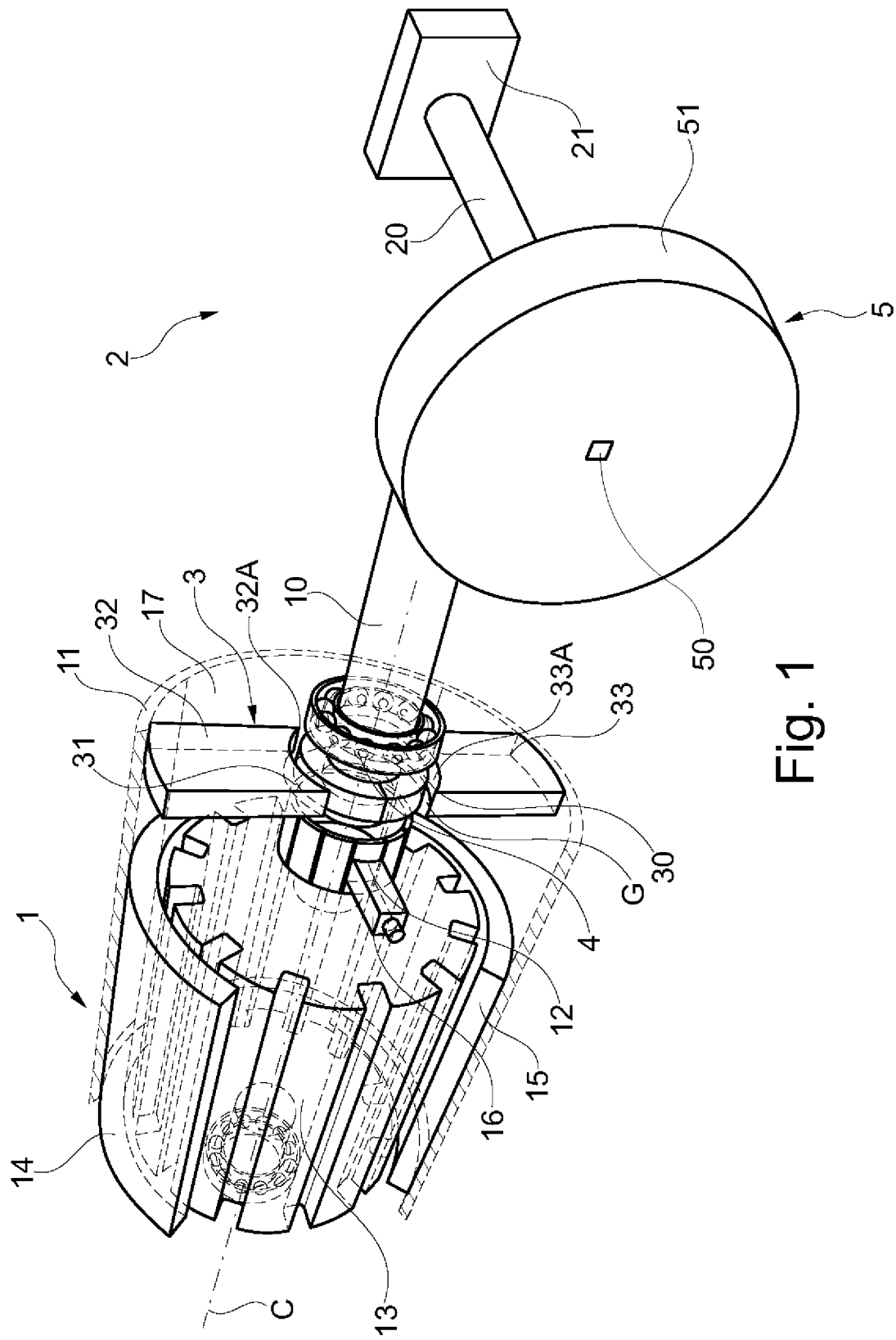
FIG. 1 is a perspective view of an arrangement in accordance with the invention, showing schematic views of an actuator with reduction gear, wherein the motor has a part of the casing taken away.

In FIG. 1 there is shown a preferred embodiment of a motor 1 equipped with a magnetic brake 3 in accordance with the invention. The motor 1 is shown in a perspective view having a part of the casing 11 cut away to show parts of the motor 1 with the magnetic brake 3.

Further FIG. 1 also shows a linear actuator 2 in a schematic manner. The linear actuator 2 comprises a rotary screw 20 and nut device 21, as is known per se. The screw 20 is normally of the trapezoid kind having a screw pitch of about 2-16 millimeter. The nut device will be attached to a member of an arrangement (not shown) where adjustment of the position is a desired function. Accordingly, by activation of the linear actuator 2 the nut device 21 will be set into a position corresponding to the amount of rotations of the screw 20, in a known manner.

Furthermore, it is schematically shown that there is preferably also included a reduction gear 5, wherein preferably a sensor 50 is arranged having one rotary part 52 and a fixed part 53 attached to the housing 51 of the reduction gear 5, as will be described more in detail below. The reduction gear 5 is preferably in the form of a worm gear device 5 having the output motor shaft 10 as input 55 and the rotary screw 20 connected to output 54. Normally the worm gear device 5 has a reduction of 10:1-60:1 to reduce the rotational speed of the motor 1 to an appropriate amount for the rotary screw 20. The worm gear device 5 and the actuator 2 are merely a part of the actual invention in a specific claim constellation, including a motor 1 in accordance with the invention. It is evident for the skilled person that also other devices/arrangements having need of the same kind of functionality, as a linear actuator in accordance with the description above, may of course also be driven by a motor 1 in accordance with the invention, and that therefore the scope of claim 1 encompasses the motor as such.

As can be seen in the partly cut through motor 1, inside of the casing 11 there is a rotor 13 attached to the motor shaft 10, Further there are a pair of stator magnets 14. 15 fixed to the casing 11, as is known per se. There is collector 12 attached to the shaft and a brush 16 fixed to the casing 11, also known per se. At the output end of the casing 11 there is arranged a bearing 4. Adjacent the endplate 17 at the output end of the motor 1, preferably at the inside thereof, there is arranged the magnetic brake 3, between the collector 12 and the bearing 4. The magnetic brake 3 comprises a rotating magnetic brake member 30, 31 which is attached to the shaft 10, either directly or indirectly. The diameter of the movable magnetic brake member 30, 31 may be about the same as the diameter of the collector 12. In a preferred embodiment it will be of a relatively small size, e.g. a radial thickness of about 1-3 mm, implying a small mass that may not cause any possibly disturbing imbalances of the rotor 13. A pair of opposing brake pole pieces 32, 33, are cooperating with the rotating magnetic brake member 30, 31. A clearance G is arranged between the outer surface of the rotating magnetic brake members 30, 31 and the inner ends of the brake pole pieces 32, 33, which preferably have a curved surface 32A, 33A facing the movable magnetic brake member 30, 31 with a corresponding radius of the rotating magnetic brake member 30, 31.

Figure 1A:
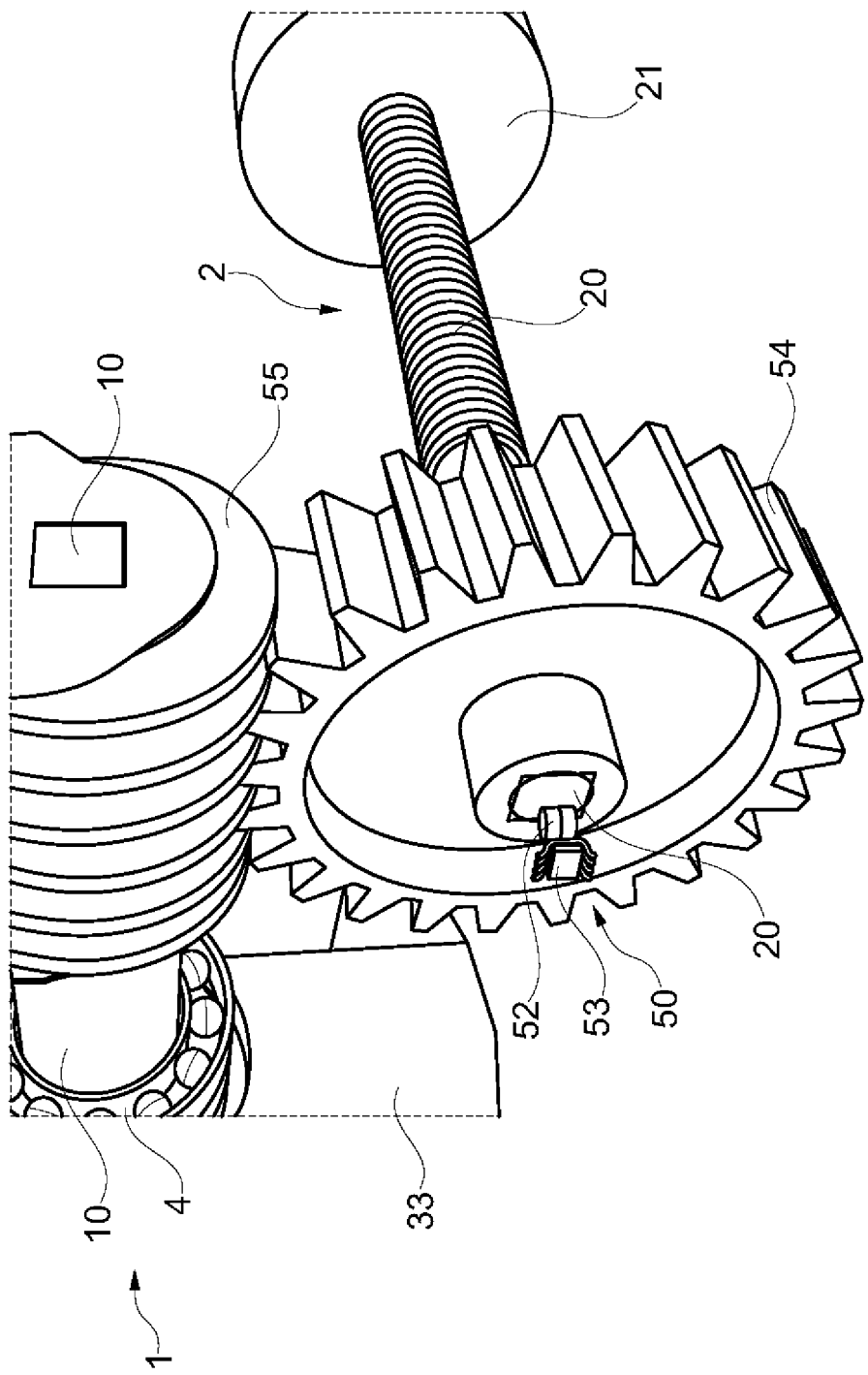
FIG. 1A is an enlarged partial perspective view of that in FIG. 1, showing schematically details of a reduction gear of an actuator in accordance with a preferred embodiment of the invention.

Furthermore FIG. 1A shows that according to a preferred embodiment the rotating part 52 of the sensor 50 is positioned at the center of the worm wheel 54, e.g. at the bottom end of the rotating shaft 20 of the actuator 2. One example of such a sensor 50 may be in the form of a fixed (to the housing 51, see FIG. 1) micro circuit 53 including a Hall sensor or other type of magnetic sensing device that senses the orientation of a small permanent magnet 52 following the rotation of the worm wheel 54. Accordingly, the sensor 50 may exactly inform regarding the angular position of the worm wheel 54 and shaft 20 and also provide information regarding the number of turns.

Thanks to the arrangement with the magnetic brake 3, there will be a force striving to position the rotating parts of the motor 1 in a specific position, i.e. having the poles of the rotating/movable magnetic brake members 30, 31 in a position where they are in balance in relation to the magnetic influence of the fixed brake pole pieces 32, 33.

The magnetic rotor 30, 31 as shown in FIG. 1 comprises to halves of an annulus (ring). In a preferred embodiment the annulus may be homogenous, e.g. in order to be able to provide an optimized balancing. The magnet 30, 31 may be preferably form a separate part attached to the shaft 10 of the motor 1, or the shaft of the actuator. The material may be for instance a ferrite material or in a more preferred a permanent magnet including neodym that may exert a higher magnetic effect than other materials. In a preferred embodiment a diameter within the range of 10-20 mm and radial thickness of about 1-3 mm is sufficient, for application used for adjusting seats of vehicles. Thank to this arrangement very little extra inertial mass will be added, which is of great importance for motors of the preferred kind to be able to work in an appropriate manner.

Test have shown that a magnetic brake force of about 1-2 Ncm is sufficient to reliably, desirably position the rotor of the motor 1, if connected to an actuator 2 via a transmission 5 with self-lock, for a motor having a max power of about 150 W. The addition of such a relatively small brake torque to the self-lock of a linear actuator in most cases is sufficient to make the self-lock 100% reliable.

In FIGS. 2-5 there are shown data from a test that has been carried through with a motor 1 in accordance with the invention, wherein FIG. 5 presents parameters used in the test.

In FIG. 5 it is for instance seen that the radius, Rr, of a motor 1 in accordance with the preferred embodiment is below 20 mm, in this case 14 mm. Hence there is a motor that may provide compactness due to its relatively small size. Furthermore, it can be seen that the inertial mass (m R*Rr$^2$/2) of the motor 1 is also relatively low, i.e. since the measures are small as also the mass mr of the rotor. Accordingly, it is beneficial that the rotating part 30 of the magnetic brake 3 has a relatively low weight, due to the fact that it in the preferred embodiment according to the invention it is positioned as a separate annulus at the periphery of the shaft 10 of the motor 1, or any other appropriate shaft connected thereto. In a preferred embodiment the inertial mass of the rotating magnetic brake part 30 should add less than 10%, preferably not more than 5% to the initial mass of the rotor. This will ensure that the rotor balance is kept at good level also after adding rotating brake member 30.

In FIG. 2 there is shown a curve presenting the rotor speed variation on the y axis and the rotational speed on the x axis. As can be seen in FIG. 2 the variation drastically decreases from 1000-2000 rpm and are more or less neglect able at rotational speeds that normally are used when driving an actuator mechanism, or similar device, with a DC motor 1 in accordance with the invention, e.g. at a rotational speed at and above 4000 rpm, no noticeable variation occurs.

Moreover, in FIG. 3 there is shown that the vibrations/oscillations also are neglectable at higher rpms. Here movement in mm is presented on the y axis and rpm on the x axis. From 1000 rpm to 2000 there is drastic decreases and at and above 3000 it is neglectable.

In FIG. 4 it is shown brake torque on the y axis and rotor angle on the x axis, and as expected it present a sinus curve. Here with a peak force of about 2 Ncm.

It is surprising that the above effects are neglectable at higher rpm. Without any binding effect we below will present some reasons why these effects in reality are neglectable. The first is the direction of vibration. Normally if there is a motor with the slightest unbalance in the rotor, vibrations will act transversally in relation to the motor axis. This direction of vibration makes it very difficult to isolate its influence from the structure where the motor is mounted. This kind of vibration will also increase in amplitude with increasing motor speed. In contrast, the direction of vibrations caused by the inventive brake member 30, 31 is rotational and will act as a sinusoidal torque acting on motor casing tangentially, i.e. around the longitudinal axis of the motor 1. Since the total moment of inertia on the complete structure of motor case with chassis where the motor 1 is mounted, in most cases is substantial, in comparison to the brake torque generated from the brake member 3 there will be a very effective reduction of the effect of these vibrations. Secondly, it depends on the physical nature of the brake function, which is sinusoidal and works in a "push pull" kind of way, where the time that the rotor passes through these phases will be less and less as the motor speed increases. This means that the time that this torque can act on the moment of inertia that is taken up by the motor casing (and mounting and chassis etc.), diminishes with speed, and thus produces less and less effect as motor speed increases.

Figure 6:
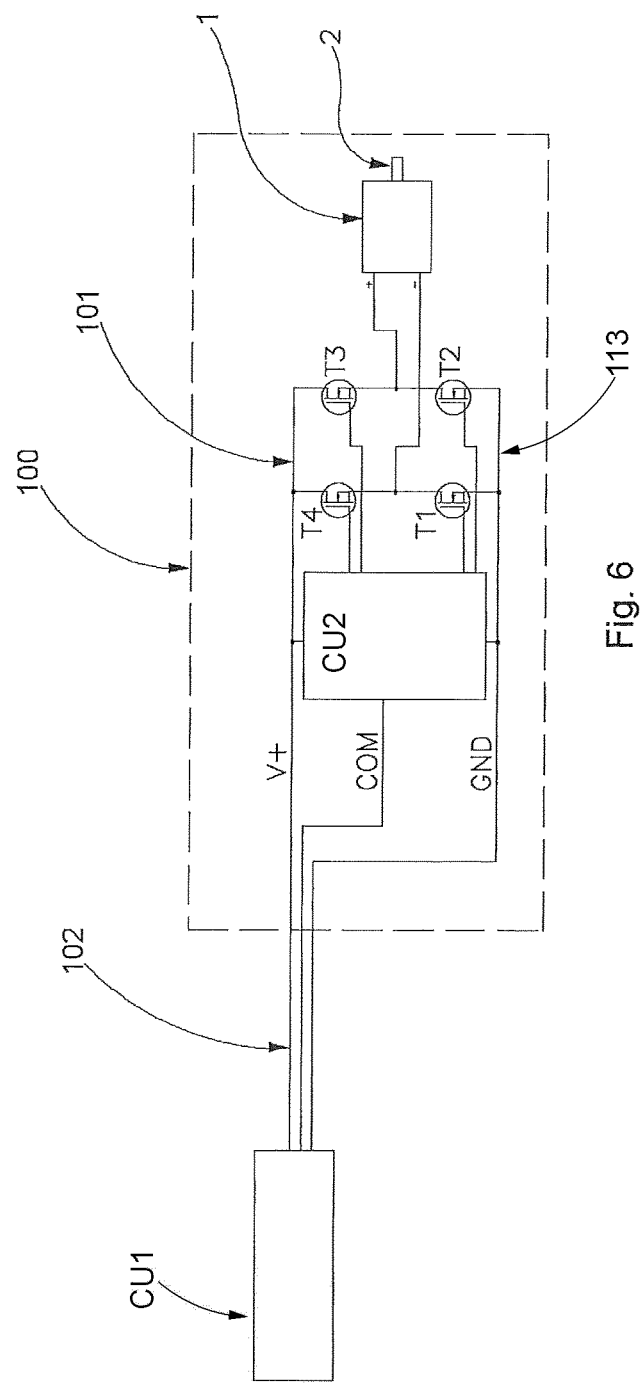
FIG. 6 is a schematic view of a control arrangement in accordance with the invention.

FIG. 6 shows a configuration where the actuator 2, motor 1 and a local controller CU2 is integrated into one unit 100. The motor 1 is controlled by the local controller CU2 through an H-bridge 101, which may include four transistors T1-T4. Typically the configuration is such that a complete system includes one (or more) actuator/s 2 controlled by a central unit CU1 which supplies power and some kind of communication, e.g. by means of three cables, GND, V+, COM, connected between the central unit CU1 and the local controller CU2, preferably partly including a wire harness 102. The local controller CU2 may preferably be designed to stop the motor 1 immediately when an error is detected by activating two of the transistors, T1 and T2, thus creating a short circuit of the motor. This short circuit will effectively stop any ongoing movement of the actuator. Examples of system errors are loss of power or loss of communication. The characteristic of the brake function of a short-circuited DC motor is that brake force is proportional to speed, i.e. at high speed, high torque is produced and most important, at close to zero speed almost no brake torque is produced. Accordingly, this provides an effect that is opposite to the characteristics of the magnetic brake 3. Hence, such a combination will thus effectively fulfil the purpose of a bolt-on brake device.

Thanks to an arrangement according to FIG. 6, efficient braking may be achieved also when connection between controller CU1 and motor 1 is lost during high speed operation in the same direction as the load. The brake effect of the magnetic brake 3 is very low, in many applications essentially zero, above a certain speed of the motor 1, in which particular case the magnetic brake 3 would fail, in comparison to a known bolt-on brake device. Hence, if this brake function is desired (or possibly required in certain applications), there is a solution by having the motor control circuit CU2, 101 mounted on to the motor arrangement itself. The circuit CU2, 101 may operate in such a way that when supply (e.g. via V+) or communication (e.g. via COM and/or GND) is lost then the motor 1 will be short-circuited. This will in a very effective manner stop any ongoing movement and subsequently, when the motor has been brought down to low speed, the magnetic brake 3 will again work effectively.

Figure 7A:
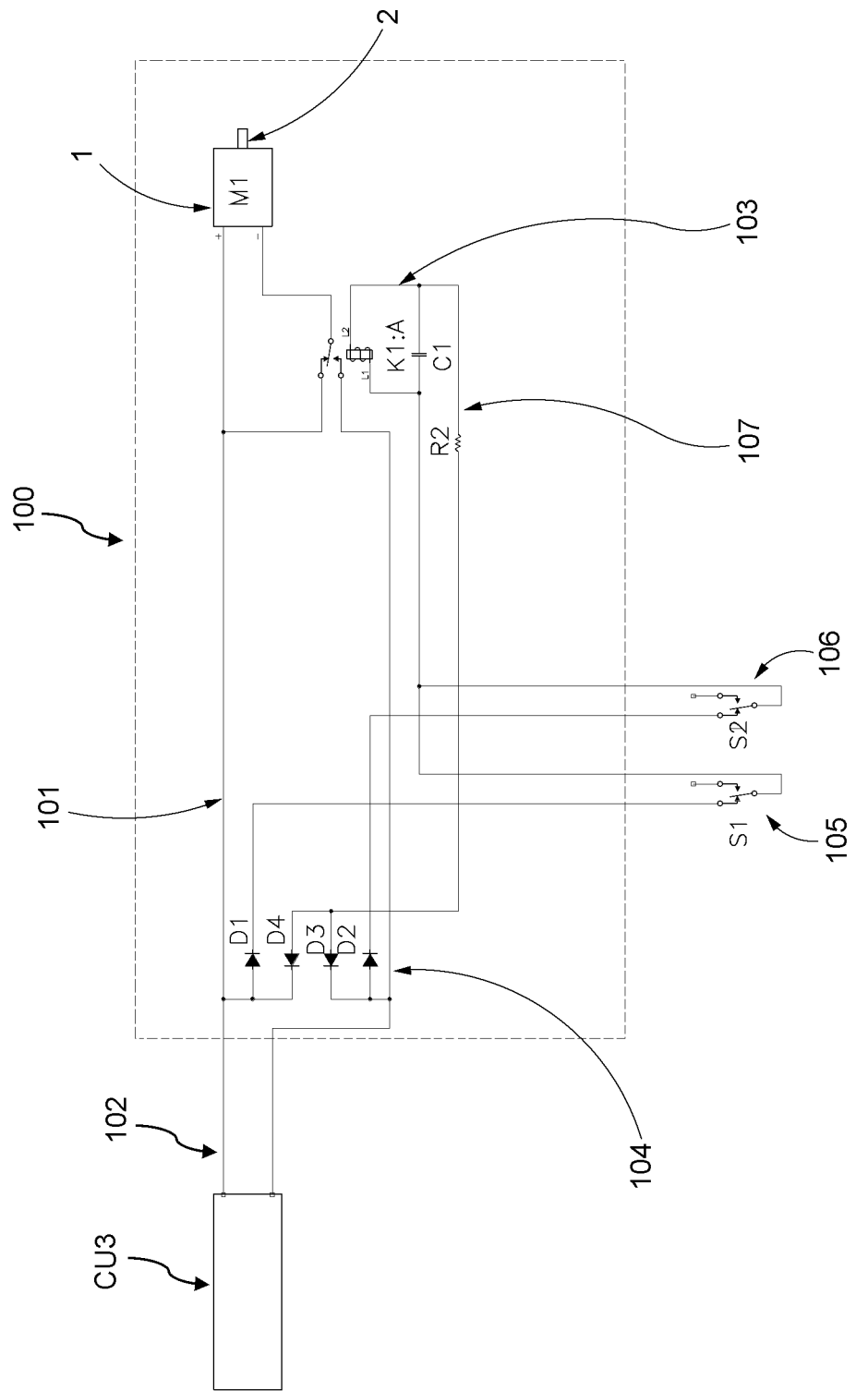
FIG. 7a is a schematic view of an alternative control arrangement in accordance with the invention.

FIG. 7a shows an alternative solution with respect to FIG. 6, where the controller CU3 has no inherent part of the actuator unit 100. The main objective is still to create a short circuit of the motor, but without having a local controller, i.e. without a local controller CU2 as shown in the embodiment of FIG. 6. The solution is in this simple form an actuator unit 100, having a circuit 101, that includes a relay 103 (K1A) which is driven by a diode bridge 104 (D1-D4), through limits switches 105 (S1) and 106 (S2), which are situated in such a way that when the actuator 2 reaches its stroke limits, the relay 103 will deactivate and short-circuit the motor 1 until sufficiently low speed is reached that the magnetic brake 3 will start to operate. The limit switches 105, 106 may preferably be included because they are normally common practice 4 in actuators units 100 of this type, and the circuit 101 will gain from the fact that high motor currents will no longer have to pass the switches 105, 106 and thereby a smaller and cheaper switches may optionally be selected.

This solution will achieve the objective as long as the actuator has some degree of self-lock, i.e. sufficient to stop the load if the connection between the controller CU3 and the actuator unit 100 is lost. But as this is not always the case, especially when trend is to increase efficiency in actuator systems which normally means reduced self-lock ability, these may preferably be added a resistance and a capacitor, the RC network 107 made up from R2, C, that may create a short time delay which can be used to diagnose the relay function, as is described in more detail below in relation to FIG. 7B. R2 may also act as a current limiter for the diode bridge 104. Some component designators in both FIGS. 7a and 7b are identical as they perform the same basic function.

Figure 7B:
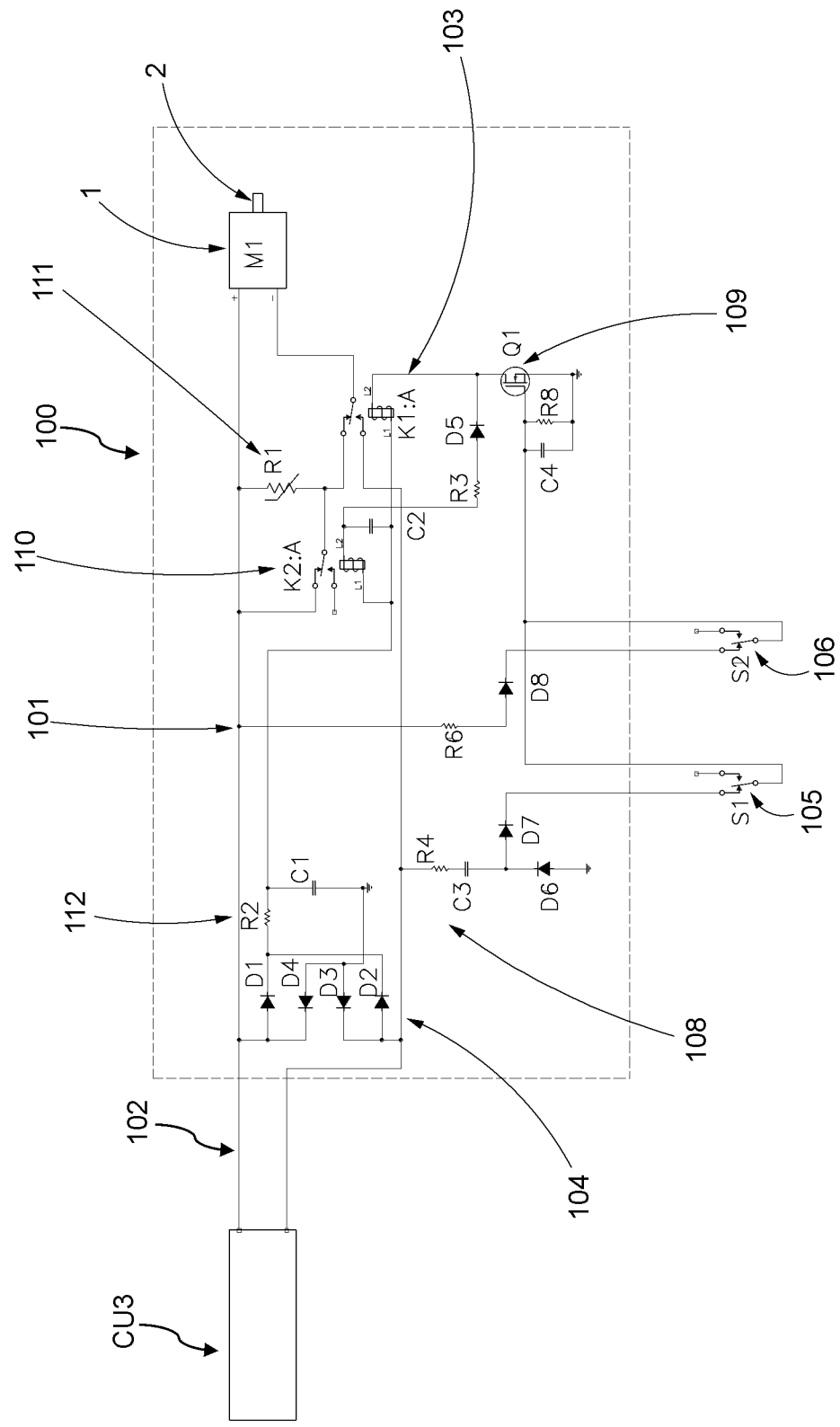

In FIG. 7b is shown a solution similar to 7a but with some added features to ensure safe operation even with actuator systems that have low or no self-lock at all. The main components are the same, i.e. a relay 103 that is activated by voltage generated from the controller CU3. But here with the added condition that in one, or both of the directions of the actuator 2, there have to be present an AC component of the driving voltage from the controller CU3. This AC voltage is normally a part of an actuator control system as a PWM modulation of the supply voltage in order to control the speed of the actuator 2. This AC component passes through a high pass filter 108 that is made up of C3, R4 and activates the relay 103 through limit switch 105 (in a first direction, the other limit switch 106 in the second direction) and switch device 108, which preferably includes a transistor Q1. This is normally only done in one direction because the typical application involves lifting some load, and the lifting direction never changes. The AC component detection should then be applied in the lowering direction, i.e. in the load direction. The main reason for the circuit 101 is that if the load falls, and the actuator is of a kind of low self-lock, it may go into regenerative mode, and then there is no way of telling if the connection between the controller CU3 and the actuator unit 100 is lost, and thereby no information would be available that can be used to decide if the relay 103, should be deactivated or not. In other words, this AC component detection circuit require a PWM signal to be present in the lowering direction, which will simply not occur if the connection between CU3 and the actuator unit 100 is lost.

As in FIG. 7a, also FIG. 7B includes the limit switches 105, 106 for end of travel detection. In addition to this, FIG. 7B also includes a feature to make end stop more smooth, by adding a second relay 110 (K2A) and a NTC resistor 111, R1 (also sometimes referred to as "inrush current limiter"). The second relay 110 is driven by the same signal, via the third switch 109, Q1, but with a small time delay on release. This means that when the third switch 109 releases, regardless of reason, the short circuit current of the motor 1 will pass the NTC resistor 111 and thus be limited. As temperature rises in the NTC resistor 111, resistance will be reduced and the motor will make a relatively smooth stop, a second relay 110, when compared to the more simple solution in FIG. 7a. As speed approaches zero, the time delay will release second relay 110 and make a full stop as intended, with near zero resistance in the motor circuit. This solution has the benefit of reducing mechanical stress on actuator components and also electric stress on relay contacts and motor commutating parts.

In systems where reliability and safety are at premium, the correct operation of the first short-circuit relay 103 may be essential. Therefore, a second RC-network 112 including, R2, C1 and R6, R8, C4, may be used to create a time delay before activation of the first relay 103, which will enable the controller CU3 to diagnose the first relay 103 for faults. This requires that the controller CU3 has the possibility to monitor motor current (which it normally does). For example, the second RC network 112 may be designed for a time delay of 15 mS, leading to the controller CU3 performing the following procedures before every activation of the motor 1:

1. Start motor with full power in the direction that involves R6 as relay activation.
2. Wait for 10 mS
3. Read motor current.
4. If motor current is above a certain level, implying faulty function, e.g. 100 mA, then abort movement.
   Else proceed in wanted direction.

This procedure will ensure that the first relay 103 is not stuck in its activated position. If the relay 103 is stuck in the deactivated position—no harm is done because motor 1 will not start. A similar procedure can be implemented also in the direction that involves the high pass filter 108 for relay activation.

The invention is not limited to the embodiment described above, but may be varied within the scope of the appended claims. For instance, for the skilled person it is evident that instead of one magnetic brake pole piece on each side, there may be arranged two, three or more, e.g. to enhance the force exerted by the fixed magnetic brake pole pieces, and also that their positioning and/or form may deviate from what has been described/shown and still achieve the basic, desired functionality. Furthermore, it is evident for the skilled person that the magnetic brake may be positioned in principle anywhere along the line of torque and fulfil its purpose, e.g. on the other side of the motor casing (than that shown), in the reduction gear, or in connection with the screw.

The invention claimed is:

1. A linear type safety actuator unit, said actuator unit (100), including an electric motor (1) driving a linear actuator (2) of, said motor (1) having a casing (11), a stator (14, 15) fixed to the casing, a rotor (13) fixed to a rotary part (10), wherein said rotary part (10) is arranged to be operatively connected to a reduction gear (5) which drives the mechanical output of the actuator (2), a separate magnetic brake unit (3), said magnetic brake (3) including a rotating brake member (30, 31) connected to a motor shaft (10), directly or indirectly, and a plurality of fixed brake members (32, 33), wherein said magnetic brake (3) is arranged to produce a torque that will strive to safely position a rotary member (10, 20) with said rotating brake member (30, 31) into one or more specific angular positions in relation to the fixed brake members (32, 33), characterized in that said rotating brake member (30, 31) is in the form of a separate permanent magnet annulus (30, 31) attached to said rotary member (10, 20) combined with having said fixed brake members (32, 33) in the form of separate magnetic pole pieces (32, 33) apart from the stator (14, 15) arranged to brake the motor at low rotational speeds and in that the actuator unit (100) is arranged with a circuitry (101) including a short circuiting safety arrangement (113, 103) arranged to enable braking of the motor (1) at rotational speeds above low rotational speeds.

2. The linear type actuator unit as claimed in claim 1, characterized in that said short circuiting arrangement (113, 103) includes a relay (K1A).

3. The linear type actuator unit as claimed in claim 1, characterized in that said short circuiting arrangement (113, 103) includes at least one transistor (T1, T2).

4. The linear type actuator unit as claimed in claim 1, characterized in that said annulus (30, 31) has inertial mass (Ia) that is less than 10% of the inertial mass (Ia) of said rotary member (10, 20).

5. The linear type actuator unit as claimed in claim 1, characterized in that said annulus (30, 31) has a diameter in the range of 10 to 30 mm, and radial thickness in the range of 1 to 4 mm.

6. The linear type actuator unit as claimed in claim 1, characterized by having said fixed brake pole members (32, 33) attached to the casing (11, 51), directly or indirectly.

7. The linear type actuator unit as claimed in claim 1, wherein a commutator (12) of said motor (1) is located between said movable magnetic brake member (30, 31) and said rotor (13), wherein said movable magnetic brake member (30, 31) is located between said commutator (12) and a bearing (4) for the motor shaft (10) of said motor (1).

8. The linear type actuator unit as claimed in claim 1, wherein said casing (11), comprises an end plate (17) for attachment of said brake pole members (32, 33).

9. The linear type actuator unit as claimed in claim 1, wherein the movable magnetic brake member (30, 31) is made from different material than said rotatable member (10,20) in the form of a permanent magnet including neodym.

10. The linear type actuator unit as claimed in claim 7, comprising an electric brushed DC motor (1) having the commutator (12) attached to the motor shaft (10), wherein the motor (1) is a twelve-pole motor.

11. The linear type actuator unit as claimed in claim 1, wherein a maximum power (P) of the motor (1) in relation to a brake torque (T) in N/cm applied to the motor shaft (10) by the magnetic brake (3) is in a region of P/50>T>P/100.

12. The linear type actuator unit as claimed in claim 1, wherein the motor (1) and actuator (2) are included in a unit (100) comprising a local controller (CU2) and an H-bridge (101) between the motor (1) and the local controller (CU2).

13. A seat for a vehicle having the linear type actuator unit as specified in claim 1.

14. The seat as claimed in claim 13, including a reduction gear (5), in a form of a worm gear with a screw (20) having a trapezoidal thread with a pitch of 2-8 mm, and wherein the reduction gear (5) has a reduction ratio in an interval between 20:1 and 60:1.

15. A method of braking an actuator included in a linear type safety actuator unit, said actuator unit (100), including an electric motor (1) driving a linear actuator (2) of, said motor (1) having a casing (11), a stator (14, 15) fixed to the casing, a rotor (13) fixed to a rotary part (10), a rotary motor shaft (10), wherein said rotary part (10) is arranged to be operatively connected to a reduction gear (5) which drives the mechanical output of the actuator (2), a separate magnetic brake unit (3), said magnetic brake (3) including a rotating brake member (30, 31) connected to the motor shaft (10), directly or indirectly, and a plurality of fixed brake members (32, 33), wherein said magnetic brake (3) produces a torque that will strive to position a rotary member (10, 20) with said rotating brake member (30, 31) into one or more specific angular positions in relation to the fixed brake members (32, 33), characterized by providing said rotating brake member (30, 31) in the form of a separate permanent magnet annulus (30, 31) attached to said rotary member (10, 20) combined with having said fixed brake members (32, 33) in the form of separate magnetic pole pieces (32, 33) apart from the stator (14, 15) that brakes the motor at low rotational speeds and by providing the actuator unit (100) with a circuitry (101) including a short circuiting arrangement (113, 103) enabling braking of the motor (1) at rotational speeds above low rotational speeds.

16. The method according to claim 15, wherein a delay of the activation of the short circuiting arrangement (103) enables a diagnose of motor current to confirm correct functioning of the relays (103) prior to activation.

* * * * *